(12) United States Patent
Stepp et al.

(10) Patent No.: US 8,119,086 B2
(45) Date of Patent: Feb. 21, 2012

(54) METHOD FOR HYDROLYZING SOLID METALLIC SALTS WITH AQUEOUS SALINE SOLUTIONS

(75) Inventors: Michael Stepp, Ueberackern (AT); Uwe Paetzold, Burghausen (DE)

(73) Assignee: Wacker Chemie AG, Munich (DE)

( * ) Notice: Subject to any disclaimer, the term of this patent is extended or adjusted under 35 U.S.C. 154(b) by 194 days.

(21) Appl. No.: 12/990,251

(22) PCT Filed: Apr. 29, 2009

(86) PCT No.: PCT/EP2009/055215
§ 371 (c)(1),
(2), (4) Date: Oct. 29, 2010

(87) PCT Pub. No.: WO2009/135794
PCT Pub. Date: Nov. 12, 2009

(65) Prior Publication Data
US 2011/0046032 A1    Feb. 24, 2011

(30) Foreign Application Priority Data
May 6, 2008  (DE) .......................... 10 2008 001 577

(51) Int. Cl.
  *B01D 12/00* (2006.01)
(52) U.S. Cl. .................... 423/131; 423/150.3; 423/111; 423/127
(58) Field of Classification Search ............... 423/150.3, 423/111, 127, 131
See application file for complete search history.

(56) References Cited

U.S. PATENT DOCUMENTS

| | | | |
|---|---|---|---|
| 3,878,291 A | 4/1975 | Keller et al. | |
| 4,125,586 A | 11/1978 | Glaeser | |
| 4,130,632 A | 12/1978 | Braunsperger et al. | |
| 5,182,095 A | 1/1993 | Ruff et al. | |
| 5,769,906 A | 6/1998 | Kremer et al. | |
| 2001/0053343 A1 | 12/2001 | Kohler et al. | |
| 2006/0183958 A1* | 8/2006 | Breneman ..................... 588/313 | |

FOREIGN PATENT DOCUMENTS

| | | |
|---|---|---|
| DE | 2623290 A1 | 12/1977 |
| DE | 4116925 A1 | 11/1992 |
| EP | 0767140 A1 | 4/1997 |
| EP | 0909623 A1 | 4/1999 |
| EP | 1174388 A1 | 1/2002 |
| GB | 437022 A | 10/1935 |
| GB | 1131354 A | 10/1968 |

OTHER PUBLICATIONS

PatBase Abstract for DE4116925 A1 in English.
"Heats of dilution of the hydrolyzing electrolytes $AlCl_3$, $Th(NO_3)_4$, and $UO_2(NO_3)_2$ at 25°C", Lange, E.; Miederer, W., Univ. Erlangen, Germany, Zeitschrift fuer Elektrochemie und Angewandte Physikalische Chemie (1957), 61 407-9.
English translation of "Heats of dilution of the hydrolzying electrolytes $AlCl_3$, $Th(NO_3)_4$, and $UO_2(NO_3)_2$ at 25°C", Lange, E.; Miederer, W., Univ. Erlangen, Germany, Zeitschrit fuer Elektrochemie und Angewandte Physikalische Chemie (1957), 61 407-9.
International Search Report for PCT/EP2009/055215.

* cited by examiner

*Primary Examiner* — Amina Khan
(74) *Attorney, Agent, or Firm* — Caesar, Rivise, Bernstein, Cohen & Pokotilow, Ltd.

(57) ABSTRACT

The invention relates to a method for hydrolyzing hydrolyzable solid metallic salts, wherein the metallic salts are reacted with aqueous saline solutions.

6 Claims, No Drawings

METHOD FOR HYDROLYZING SOLID METALLIC SALTS WITH AQUEOUS SALINE SOLUTIONS

BACKGROUND OF THE INVENTION

The invention relates to a method for the hydrolysis of hydrolyzable solid metal salts with aqueous salt solutions.

In the conversion of chlorosilanes from metallurgical silicon and HCl gas to form trichlorosilane (TCS) and silicon tetrachloride (STC), which are used for example as starting materials for the production of semiconductor-pure silicon, solar silicon as well as highly dispersed silicic acid, metal salts, principally metal chlorides, are formed as byproducts. In particular aluminum chloride and iron chloride are precipitated as solids on cooling the reaction mixture. A targeted separation of the solids is important for process technology reasons, in order to avoid disruptions in the distillative working-up of the liquid silanes. Various methods are known for separating the solid metal chlorides from the process.

DE 2623290 A1 describes the precipitation of $AlCl_3$, mixed with $FeCl_3$, from the gaseous reaction mixture of chlorosilanes in Liebig tubes. The cleaning of the Liebig tubes is not described.

Since the solids are as a rule mixtures of highly corrosive compounds, the immediately following hydrolysis and possible neutralization of the resultant aqueous solutions is preferred to a purification of the solids (for a utilization). In the hydrolysis of the anhydrous metal chlorides (in particular of the main constituent aluminum chloride) it is known that a very large amount of heat is released, and if the heat is not sufficiently dissipated this can lead to evaporation of the water and as a consequence to an uncontrolled pressure build-up and thus to dangerous plant conditions and even an explosion.

For safety reasons apparatus and plant parts that are contaminated with these metal chlorides therefore have to be dismantled for cleaning by hydrolysis. This involves, apart from the danger of accidents when opening the plant and transporting the contaminated apparatus, a high logistical effort and expenditure in order to avoid downtimes. The associated safety risks as well as the costs involved are considerable.

As an alternative a method is described for example in EP 1174388 A1, in which the metal chlorides after precipitation in a quenching device are filtered off in a complicated manner and thereby isolated in a usable form. Since however as a rule mixtures of metal chlorides are involved, here too the hydrolysis and subsequent disposal via an effluent treatment plant is economically more advantageous than a further costly and complicated purification. The hydrolysis can then be controlled via the metering rate of the filter cake.

DE 4116925 C describes the recovery of the chemically bound chlorine in the distillation sump of the direct synthesis of chlorosilanes or organochlorosilanes, as hydrogen chloride by conversion with sulfuric acid. This however requires an additional complicated process technology plant for releasing and purifying the HCl and neutralizing the sulfuric acid residue.

The hydrolysis of $AlCl_3$ in hydrochloric acid solution is described in "Heats of dilution of the hydrolyzing electrolytes $AlCl_3$, $Th(NO_3)_4$, and $UO_2(NO_3)_2$ at 25° C.", Lange, E.; Miederer, W., Univ. Erlangen, Germany, Zeitschrift fuer Elektrochemie und Angewandte Physikalische Chemie (1957), 61 407-9. In this case, in contrast to hydrolysis in pure water, surprisingly even positive hydrolysis enthalpies were measured. The use of hydrochloric acid is however costly and also problematic, especially with regard to the disposal of the hydrolysis products via an effluent treatment plant on account of the additional water contamination and the high corrosiveness.

The removal of $AlCl_3$ from liquid $TiCl_4$ with the aid of NaCl/water at high temperature is described in U.S. Pat. No. 4,125,586 A.

The object therefore existed of hydrolyzing hydrolyzable metal salts in a simple and safe way.

SUMMARY OF THE INVENTION

The subject matter of the invention is a method for the hydrolysis of hydrolyzable solid metal salts, in which the metal salts are reacted with aqueous salt solutions.

The hydrolysis reaction can be carried out in a controlled manner using the method according to the invention. By using aqueous salt solutions the release of heat in the hydrolysis of the metal salts can be delayed. A reliable and inexpensive continuous cleaning of metal salt deposits on plant parts in the installed state is thus possible.

DETAILED DESCRIPTION OF PREFERRED EMBODIMENTS

In the hydrolysis of metal salt deposits according to the method of the invention preferably an aqueous salt solution is brought into contact with the solid surface of the deposit until the desired cleaning effect is achieved. The exothermic hydrolysis then takes place significantly more slowly. The reaction rate can be matched via the salt concentration to the removal of heat. The method according to the invention is particularly well suited to a continuous mode of operation. For example, apparatus such as Liebig tubes can be freed from adhering metal chlorides by passing an aqueous salt solution through them until the desired conversion is achieved. The complete cleaning can then be detected directly in the outflowing aqueous mixture by means of an indicator (e.g. pH electrode, temperature measurement, electrical conductivity measurement, thermal conductivity measurement, refractive index measurement, density measurement, turbidity measurement), so that the procedure can also be simply automated.

As salts for the aqueous salt solutions all alkali metal chlorides, sulfates, phosphates, as well as alkaline earth metal chlorides and also their hydrates may be used. Preferably solutions of alkali metal and alkaline earth metal chlorides are used, especially alkali metal chlorides, particularly preferably sodium chloride. Mixtures of various salts can also be used. The purity of the used salts is of minor importance so long as the proportion of reactive constituents (in particular basic compounds) simply varies by one percentage point. Normally technical quality salts with purities of >90% are used. Byproduct salts from technical processes can also be used. The aqueous solution is produced by simply dissolving the salts in water in an apparatus suitable for this purpose, such as for example a stirred vessel, optionally at elevated temperature in order to accelerate the solution process. The optimal salt concentration can be determined by simple preliminary tests, in which one normally starts with a saturated solution in order to avoid undesirable overheating. The salt concentration can range from 0.5 wt. %, preferably from 10 wt. % to the saturation concentration at the respective temperature. With sodium chloride the preferred range at 25° C. is 10 to 36 wt. %, particularly preferably 15 to 25 wt. %. At lower salt concentrations there is more likely to be an undesirably high temperature increase than at higher concentrations. The salt solution can either be prepared as a stock solution and temporarily stored in a container, or can be freshly prepared immediately before use. In general it is unimportant whether undissolved constituents are still present in the solution so long as the concentration of dissolved salt is in the target range. On account of different solubilities this may be the case for example with salt mixtures or technical salt qualities.

Suitable solid metal salts are for example aluminum chloride and iron chloride, optionally mixed with other oxides or metal chlorides. In particular metal chlorides from the silane production are used, which may contain adhesions of liquid chlorides, in particular of chloro(poly)silanes, chloro(poly)-siloxanes possibly with Si-bonded hydrogen, as well as titanium chlorides and metal oxides. Such metal chlorides are mixtures of mainly aluminum chloride and iron chlorides, chromium chlorides, $CaCl_2$ and optionally further metal salts.

The hydrolysis procedure can in principle be carried out at temperatures from 0° C. to 100° C. Lower process temperatures are possible so long as this permits a depression of the melting point by the corresponding salt concentration. Higher temperatures are however also conceivable so long as vaporization of the water is prevented by employing excess pressure. Normal practice is to carry out the conversion at normal pressure in a temperature range up to 80° C., preferably up to 60° C., so that a sufficient temperature differential between this and the boiling point of water is ensured and a pressure build-up can be avoided.

The method can be carried out batchwise or continuously. In the batch process the solid metal salt to be hydrolyzed is preferably either placed in a suitable vessel and the salt solution is added, or the salt solution is placed in the vessel and the solid metal salt is added in a controlled manner via a solids metering device or conveying device (conveying screw, solids lock). Preferably in production plants the method according to the invention is operated continuously. The apparatus to be cleaned (pipelines, such as Liebig tubes, vessels, etc.) are in this connection flushed as far as possible in the installed state with the salt solution. For this, the apparatus is connected preferably via fixed pipeline connections to the device for supplying the salt solution. In this way emissions into the atmosphere can be avoided. The method according to the invention can however also be carried out on dismantled apparatus, which in this case is connected to a special device (cleaning stand) and is thoroughly flushed with the salt solution. The flushing procedure is preferably carried out by conveying the salt solution by means of a pump (membrane pump, centrifugal pump, canned pump, gear-type pump, piston pump, etc.). The conveying of the salt solution through the plant parts to be cleaned can however also be carried out by producing a hydrostatic pressure, for example by means of a high-level vessel or by applying a gas pressure (e.g. compressed air, nitrogen).

The throughput of the salt solution is preferably chosen so that the cleaning takes place as quickly and as reliably as possible. The throughput is governed by the salt concentration in the cleaning solution as well as by the process temperature. The optimal process parameters can be determined by simple preliminary tests, e.g. by measuring the temperature at the outlet of the flushing liquid. In this connection salt concentrations that are as high as possible will initially be used in order to avoid an undesirable overheating.

The aqueous, acidic solution occurring in the cleaning process is preferably passed either to an effluent treatment plant designed for this purpose or to another water treatment step (e.g. neutralization, precipitation), in which the water contaminating constituents are separated and can optionally be passed to a further application or utilization.

In the following examples and comparison examples, unless otherwise stated all amounts and percentages are by weight and all conversions are carried out at a pressure of 0.10 MPa (absolute).

EXAMPLE 1

Continuous Method

In a test stand a 20% aqueous sodium chloride solution (technical purity 99.5%) is pumped via a centrifugal pump through a Liebig tube coated with a 65 kg deposit of aluminum chloride from the crude silane production, at a throughput of 100 kg/hour until the deposit had completely dissolved. The conversion is carried out at ambient temperature (19° C.). The outflowing mixture (white suspension) is heated up to 37° C. without additional cooling of the tube, and is continuously passed to an effluent treatment plant. After 1 hour and 39 minutes a pH difference between the inflow and outflow can no longer be detected; the outflow is clear and the deposit has completely dissolved away.

EXAMPLE 2

Batch Test

In a 600 ml beaker a solution of 106.6 g of NaCl in 276.1 g of water is stirred with a blade stirrer at 220 rpm and a lump of metal chloride weighing 17.7 g from the chlorosilane production ($AlCl_3$) is added. The temperature rises within 13 minutes from 24° C. to a maximum value of 44° C. and, after the solid has completely dissolved after 27 minutes, falls to 40° C. A white suspension is formed.

EXAMPLE 3

Batch Test

In a 600 ml beaker a solution of 84.8 g of NaCl in 279.2 g of water is stirred with a blade stirrer at 220 rpm and a lump of metal chloride weighing 19.3 g from the chlorosilane production ($AlCl_3$) is added. The temperature rises within 13 minutes from 21° C. to a maximum value of 42° C. and, after the solid has completely dissolved after 27 minutes, falls to 39° C. A white suspension is formed.

EXAMPLE 4

Batch Test

In a 600 ml beaker a solution of 41.8 g of NaCl in 298 g of water is stirred with a blade stirrer at 220 rpm and a lump of metal chloride weighing 19.1 g from the chlorosilane production ($AlCl_3$) is added. The temperature rises within 1 minute from 21° C. to a maximum value of 54° C., the solid having completely dissolved. A white suspension is formed.

Comparison Example

Hydrolysis In Water 196.6 g of water are placed in a 600 ml beaker. A lump of metal chloride weighing 12.6 g from the chlorosilane production ($AlCl_3$) is added while stirring with the blade stirrer at 220 rpm. The temperature rises within seconds from 23° C. to a maximum value of 54° C. and, after the solid has completely dissolved after 1 minute, has fallen to 53° C. A clear solution is formed.

EXAMPLE 5

Batch Test

In a 600 ml beaker a solution of 48.3 g of $MgSO_4$ in 166.9 g of water (15.6 g of water/g $AlCl_3$) is stirred with a blade stirrer at 220 rpm and a lump of metal chloride weighing 10.7 g from the chlorosilane production ($AlCl_3$) is added. The temperature rises within 22 minutes from 20° C. to a maximum value of 32° C. and, after the solid has completely dissolved after 100 minutes, falls to 24° C.

EXAMPLE 6

Batch Test

In a 600 ml beaker a solution of 113.2 g of $CaCl_2$ in 212.2 g of water (15.6 g of water/g $AlCl_3$) is stirred with a blade stirrer at 220 rpm and a lump of metal chloride weighing 13.6 g from the chlorosilane production ($AlCl_3$) is added. The temperature rises within 22 minutes from 24° C. to a maximum value of 35° C. and, after the solid has completely dissolved after 100 minutes, falls to 27° C.

EXAMPLE 7

Batch Test

In a 600 ml beaker a solution of 235.8 g of $MgCl_2.6H_2O$ in 240.2 g of water (15.6 g of water/g $AlCl_3$) is stirred with a blade stirrer at 220 rpm and a lump of metal chloride weighing 15.4 g from the chlorosilane production ($AlCl_3$) is added. The temperature rises within 22 minutes from 25° C. to a maximum value of 37° C. and, after the solid has completely dissolved after 60 minutes, falls to 32° C.

EXAMPLE 8

Batch Test

In a 600 ml beaker a solution of 50.3 g of NaCl in 255.8 g of water (15.6 g of water/g $AlCl_3$) is stirred with a blade stirrer at 220 rpm and a lump of metal chloride weighing 16.4 g from the chlorosilane production ($AlCl_3$) is added. The temperature rises within 9 minutes from 21° C. to a maximum value of 46° C. and, after the solid has completely dissolved after 16 minutes, falls to 43° C.

The invention claimed is:

1. A method for removing hydrolyzable solid metal salt deposits from plant parts in an installed state, said method comprising:
   providing an aqueous salt solution comprising alkali metal chlorides and alkaline earth metal chlorides in an amount from 10 wt. % to a saturation concentration at a respective temperature; and
   hydrolyzing at least one solid metal salt selected from the group consisting of aluminium chloride and iron chloride, wherein a release of heat in the hydrolyzing of the at least one solid metal salt is delayed by reacting the at least one solid metal salt with the aqueous salt solution, whereby the hydrolyzable solid metal salt deposits are removed from the plant parts in the installed state.

2. The method of claim 1, wherein the at least one solid metal salt is aluminium chloride.

3. The method of claim 1, wherein the amount of alkali metal chlorides and alkaline earth metal chlorides in the aqueous salt solution is 10 to 36 wt. %.

4. The method of claim 1, wherein the at least one solid metal salt is iron chloride.

5. The method of claim 1, wherein the at least one solid metal salt comprises both aluminium chloride and iron chloride.

6. The method of claim 1, wherein the plant parts are at least one member selected from the group consisting of pipelines and vessels.

* * * * *